Jan. 31, 1967  K. K. BARNES  3,300,955
APPARATUS WITH CUTTING MECHANISM FOR USE
IN HARVESTING LETTUCE
Filed Nov. 8, 1963
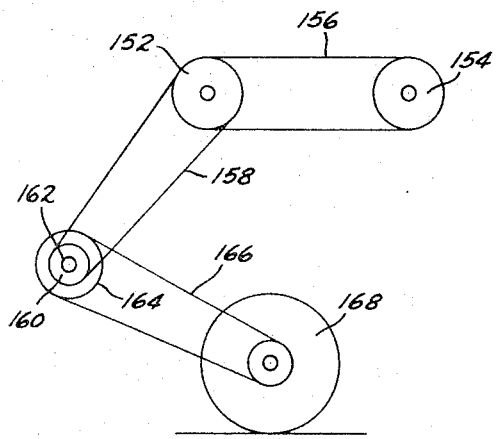
Fig 9
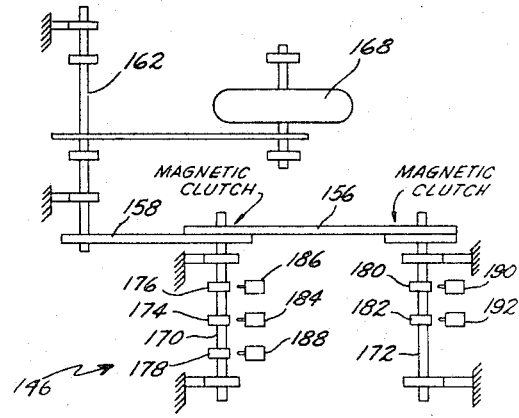
Fig 10
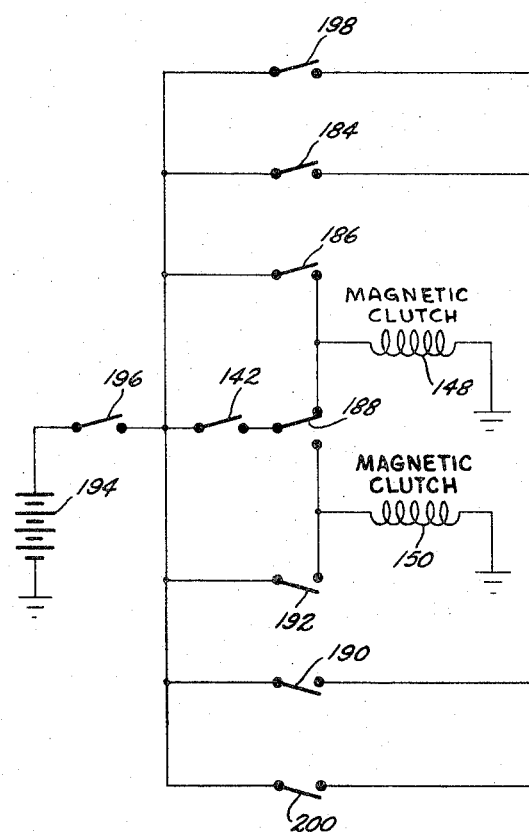
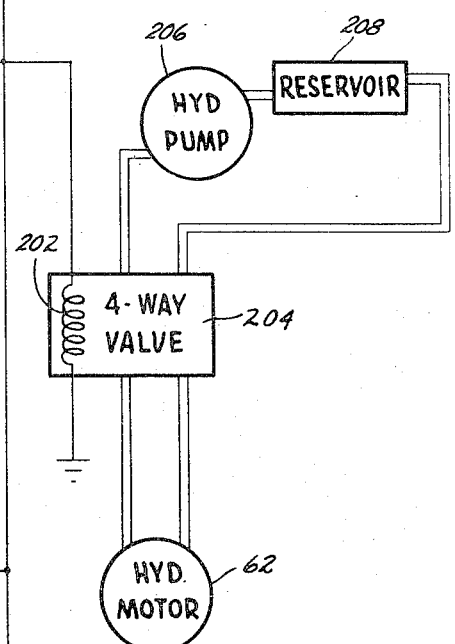
Fig 11
INVENTOR.
KENNETH K. BARNES
BY
Meyers & Peterson
ATTORNEYS

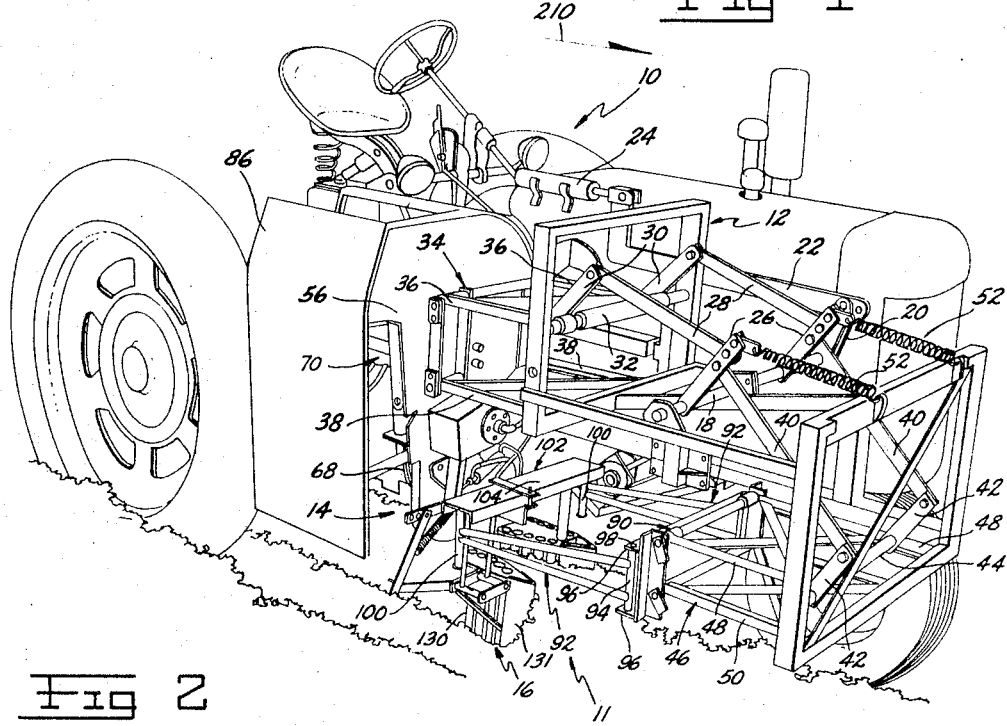

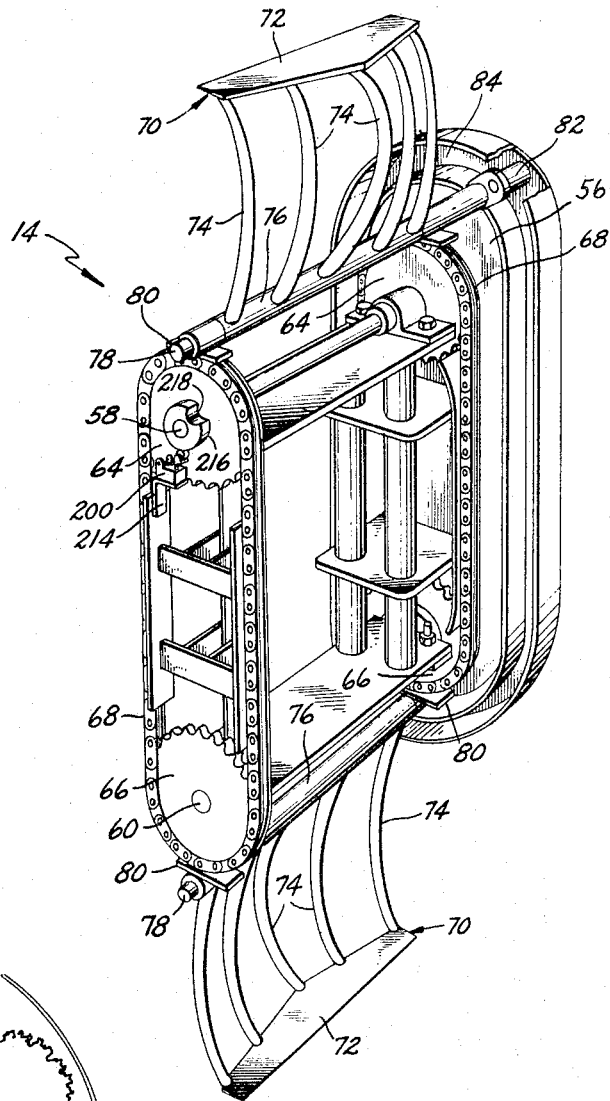

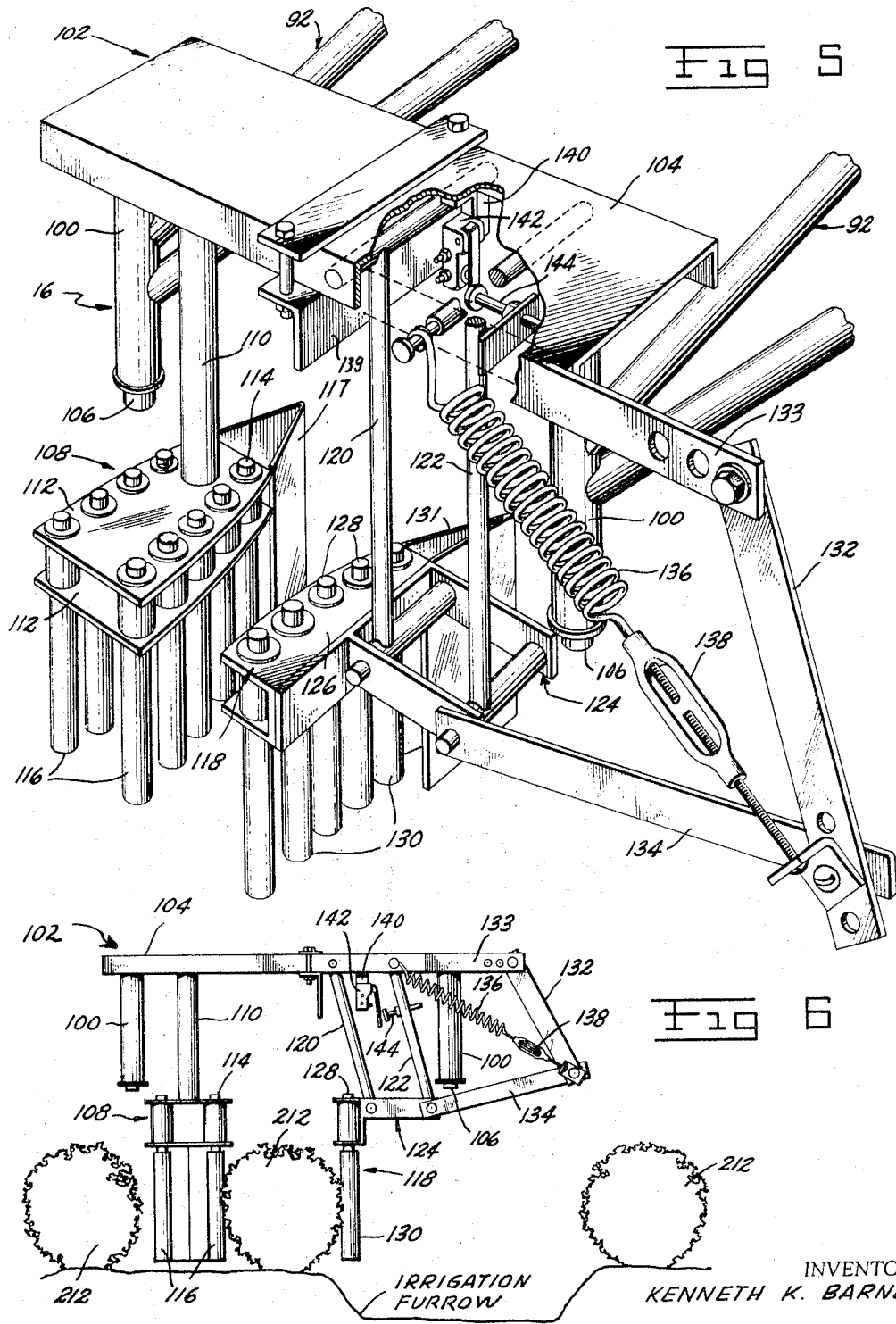

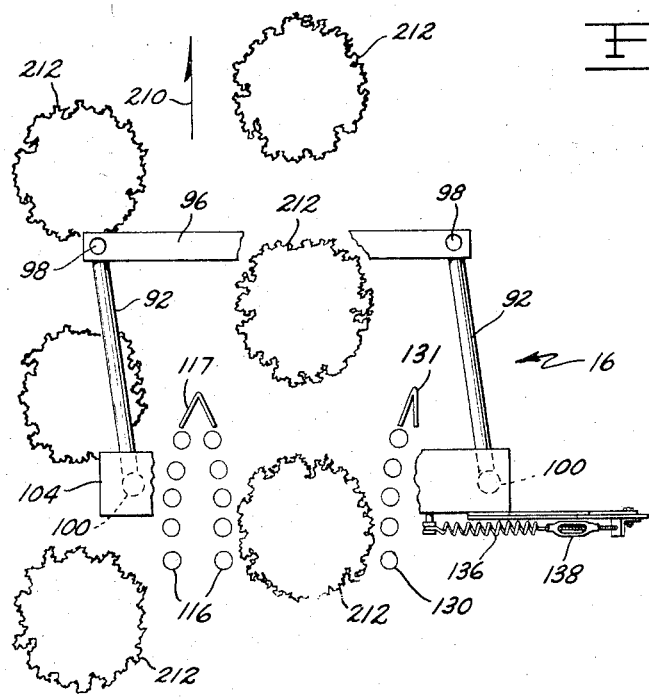
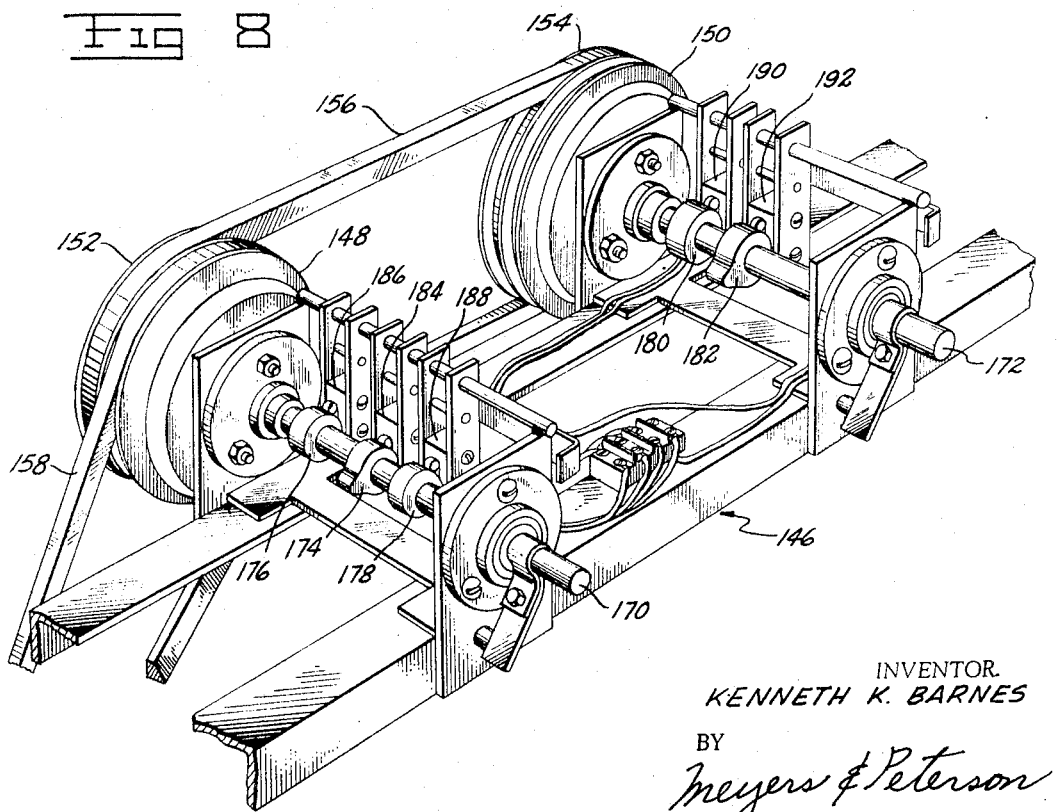

United States Patent Office 3,300,955
Patented Jan. 31, 1967

3,300,955
APPARATUS WITH CUTTING MECHANISM FOR USE IN HARVESTING LETTUCE
Kenneth K. Barnes, Tucson, Ariz., assignor to Arizona Research Foundation, Inc., Tucson, Ariz., a corporation of Arizona
Filed Nov. 8, 1963, Ser. No. 322,466
14 Claims. (Cl. 56—327)

This invention relates generally to apparatus for harvesting crisphead lettuce, and pertains more particularly to a cutting mechanism for removing individual heads of lettuce from a row of such lettuce.

One object of the invention is to provide a cutting mechanism for a lettuce harvester that will sever a head of lettuce at the base of the plant without injuring the head and which will transport the severed head to a position such that it may be properly deposited on a suitable conveyor or in an appropriate receptacle.

Another object of the invention is to provide a cutting mechanism for lettuce harvesters that will not damage adjacent lettuce heads, whether they be of sufficient maturity for harvest or whether they require further growth.

A further object of the invention is to provide a cutting mechanism that can be operated intermittently so that only selected lettuce heads will be severed from a row of lettuce plants along which the cutting mechanism is moving.

The invention has for still another object the provision of a cutting mechanism which includes a plurality of baskets or cradles which can be moved through a predetermined path and which mechanism is rugged so that it is not likely to require any appreciable amount of maintenance or attention.

Yet another object of the invention is to provide apparatus of the foregoing character that can be operated by relatively inexperienced personnel.

These and other objects and advantages of my invention will more fully appear from the following description, made in connection with the accompanying drawings, wherein like reference characters refer to the same or similar parts throughout the several views and in which:

FIGURE 1 is a perspective view of the lettuce harvester constructed in accordance with the teachings of the present invention, the harvester being mounted to one side of a conventional tractor;

FIGURE 2 is a perspective view on a somewhat larger scale, the view being in a direction to show the lower portion of the cutting mechanism and all of the major parts constituting the sensing mechanism which determines whether or not a particular head of lettuce is to be harvested by the cutting mechanism;

FIGURE 3 is a perspective view of the cutting mechanism with the shields removed therefrom, the view being taken at an angle from the rear;

FIGURE 4 is a rather diagrammatic elevational view of the cutter mechanism as would be seen directly from the rear thereof;

FIGURE 5 is a perspective view of the sensing mechanism taken at an angle from the rear, the view depicting the movable compression roller assembly in the position it assumes when no lettuce head is being sensed;

FIGURE 6 is a rear elevational view of the sensing mechanism when the mechanism is actually determining whether a head of lettuce is sufficiently mature for harvesting, the view being somewhat diagrammatic;

FIGURE 7 is a top plan view of the sensing mechanism, the view corresponding to FIGURE 6 and also being somewhat diagrammatic;

FIGURE 8 is a perspective view looking somewhat downwardly on the delay or memory unit that is instrumental in causing actuation of the cutter mechanism after the tractor has traveled a predetermined distance after the sensing mechanism has determined that a particular head of lettuce should be harvested;

FIGURE 9 is a side elevational view, diagrammatically presented, which illustrates the belt drive extending from a ground wheel for measuring the predetermined distance mentioned in connection with the description of FIGURE 8;

FIGURE 10 is a diagrammatic top plan view of the memory unit illustrated in FIGURE 8 and also the ground wheel depicted in FIGURE 9, and FIGURE 11 is a schematic diagram of the circuitry associated with the memory unit, the view also showing the hydraulic pump and the hydraulic motor for operating the cutting mechanism.

Referring first to FIGURE 1, a conventional tractor 10 has been pictured which serves as the carrier in the illustrated instance for the lettuce harvester indicated in its entirety by the reference numeral 11. Although the lettuce harvester 11 is shown mounted to one side of an ordinary farm tractor, this does not mean that the harvester would always be so mounted. It is within the purview of the invention to provide power and mobility for a commercially produced machine that would be completely self-contained. Nonetheless, for a one-row prototype unit, the tractor 10 serves as a convenient, ready-made power source and carrier. For a multi-row commercially produced lettuce harvester of this type, the machine or carrier might well take the form of a trailed implement with or without a separate power source for operating the harvester. In other words, the tractor 10 does not constitute any integral part of the invention.

It will be observed from FIGURE 1 that the lettuce harvester 11 includes in the illustrated instance a common main frame structure 12 that is fixedly attached to one side of the tractor 10 and which frame supports a cutting mechanism 14 and a sensing mechanism 16 (described in detail hereinafter). Inasmuch as this frame structure 12 can assume a variety of forms, it need not be described in detail. It does have mounted thereon, though, a rock shaft 18 with a crank element 20 at the end thereof adjacent the tractor 10. It is contemplated that the rock shaft be hydraulically actuated and with this in mind a link 22 extends rearwardly from the crank element 20 to a hydraulic operating cylinder 24. In order to make the operating cylinder 24 visible, an L-shaped configuration is imparted to the link 22.

Attention is called to the presence of a pair of integral arms 26 on the rock shaft 18. The upper ends of these arms 26 are pivotally connected to a first pair of rearwardly extending links 28, the links 28 having pivotal connection at their rear ends with a pair of arms 30 on a rear rock shaft 32 journaled on the frame structure 12. The rock shaft 32 is instrumental in actuating a parallelogram lift frame 34 which includes a pair of upper members 36 and a pair of lower members 38. The forward ends of the upper members 36 are connected directly to the rock shaft 32 so as to be moved angularly when the rock shaft is rocked or rotated. The forward ends of the lower members 38 are pivotally connected directly to the frame structure 12. The rear ends of the upper and lower members 36, 38 are pivotally attached to the cutting mechanism 14.

A second pair of links 40 extend forwardly from the previously mentioned arms 26 on the rock shaft 18. These additional links 40 have pivotal connection with a pair of arms 42 on a forward rock shaft 44. Whereas the rear rock shaft 32 actuates the parallelogram lift frame 34, it is the function of the forward rock shaft 44 to actuate in a similar manner a parallelogram lift frame 46 having a pair of upper members 48 and a pair of lower members 50. The upper members 48 are integrally attached at their forward ends to the rock shaft 44 and the lower members 50 are pivotally attached directly to the frame structure 12. It is the rear ends of these members 48, 50 that are pivotally connected to the sensing mechanism 16.

As should now be evident from the foregoing description, the hydraulic operating cylinder 24 is responsible for raising and lowering the cutting mechanism 14 and the sensing mechanism 16, thereby allowing these mechanisms to be lowered from a transport position to the operating position illustrated in FIGURE 1 without changing the attitude of either mechanism 14, 16 with respect to the lettuce row. When the mechanisms 14, 16 are lowered to the operating position depicted in FIGURE 1, the system is partially supported by a pair of coil springs 52 connected at one end to the arms 26 on the rock shaft 18 and attached at their opposite ends to the frame structure 12. The remaining weight of the cutting mechanism 14 and the sensing mechanism 16 is ground supported through a support shoe 54, this shoe being best seen in FIGURE 2.

The cutting mechanism 14 will now be described in detail. The mechanism 14, which also performs a conveying function, includes a vertical mounting plate 56 disposed in a transverse plane, the rear ends of the previously mentioned upper and lower members 36, 38 of the parallelogram lift frame 34 being pivotally connected to this plate. From FIGURE 3, it will be discerned that there are upper and lower rearwardly projecting shafts 58 and 60, respectively, that are journaled at one end to the plate 56. At the forward side of the plate 56, as can be seen from FIGURE 2, is a hydraulic motor 62 for driving the lower shaft 60. A pair of driven sprockets 64 are carried on the upper shaft 58 and a similar pair of sprockets 66 are fixedly mounted on the lower shaft 60, a pair of chains 68 being entrained about the sprockets 64, 66 so as to cause movement of the upper shaft 58 in unison with the lower shaft 60.

For effecting the cutting and carrying of the harvested lettuce heads are a pair of knife baskets denoted generally by the reference 70. These baskets are each equipped with a knife edge 72 and a basket or cradle portion 74. Also included in each knife basket 70 is a sleeve 76 that is keyed to a shaft 78, the shafts 78 having their ends journaled in bearing members 80 affixed to spaced portions of the chains 68. Each shaft 78 has a cam follower 82 which rides in a common cam track or groove 84 on the mounting plate 56. The cam followers 82, one of which is shown in FIGURE 3, controls, depending upon the track profile that is selected, the orientation of the knife baskets 70 as they move through a complete cycle.

At this time, it should be mentioned that a shield 86 has been shown in FIGURE 1, this shield concealing for the most part the cutting mechanism 14. The shield also appears fragmentarily in FIGURE 2 but the difference in direction that the view is taken permits some of the cutting mechanism to be seen. The shield 86, of course, is employed in actual practice and has been shown in its normal position in FIGURES 1 and 2 because the removal of the shield, especially from FIGURE 1, would show the cutting mechanism 14 on too small a scale for real clarity of understanding. Nonetheless, the reader is initially informed of the location of the cutting mechanism 14 and additional resort to FIGURE 3, as well as FIGURE 4, will indicate the actual construction of the cutting mechanism. While not appearing in FIGURES 1 and 2, the invention contemplates the use of a conveyor for carrying the harvested lettuce heads to a vantage point, such as a hopper. Accordingly, a conveyor 88 has been illustrated rather schematically in FIGURE 4. It will be appreciated that this conveyor can be added to the construction depicted in FIGURES 1 and 2 but would serve no useful purpose as far as the appreciation of the invention itself is concerned.

The sensing mechanism 16 will now be described in detail. In this regard, it will be observed that there is a transverse frame 90 employed to which the rear ends of the upper and lower members 48, 50 are pivotally attached. The upper and lower members 48, 50 are parts of the parallelogram lift frame 46. Thus, the transverse frame acts as a vertical link in the parallelogram lift frame 46. Extending rearwardly from the frame 90 are arm assemblies 92, there being one such assembly at each side of the frame 90. By reason of a vertical sleeve 94 integral with the forward end of each arm assembly 92 and upper and lower horizontal ears 96 on the transverse frame 90 itself, plus vertical pivot pins 98 extending through the ears and vertical sleeves, the two arm assemblies 92 are mounted for swinging movement in a horizontal plane about the parallel vertical axes provided by the sleeves 94 and the pins 98 extending therethrough. The arm assemblies 92 also have integral vertical sleeves 100 at the rear end thereof.

At this time, attention is directed to the presence of what will be termed a rear subframe 102 that comprises an inverted channel member 104 resting on the upper ends of the vertical sleeves 100 of the arm assemblies 92. To effect a pivotal connection of the vertical sleeves 100 with the rear subframe 102 are a pair of downwardly projecting shafts 106 that are fixedly attached at their upper ends to the underside of the channel member 104. Consequently, the structure comprising the transverse frame 90, the arm assemblies 92 and the rear subframe 102 form a parallelogram when viewed from above, being capable of swinging into proper juxtaposition with respect to the lettuce row being traversed by the harvester 11.

Playing a very important role with respect to the sensing operation performed by the mechanism 16 is a fixed compression roller assembly 108 that includes a downwardly extending column or bar 110 fixed at the upper end to the underside of the channel member 104 belonging to the rear subframe 102. The construction of the compression roller assembly 108 is best understood from FIGURE 5. It will be observed that a pair of horizontal plate members 112 serve as a bearing mount for a plurality of shafts 114 carrying cylindrical rollers 116 that project downwardly, actually forming a V-shaped configuration as can be seen in the schematic representation set forth in FIGURE 7.

Cooperable with the compression roller assembly 108 is a movable compression roller assembly 118. The construction of the assembly 118 can be comprehended from both FIGURES 5 and 6, especially the latter even though shown rather diagrammatically. It will be noted that a pair of parallel suspension links 120, 122 are pivoted at their upper ends to the inverted channel member 104 of the rear subframe 102 and are pivoted at their lower ends to a rectangular frame 124, the frame 124 having a rectangular appearance when viewed from above. The rectangular frame 124 has fixedly attached thereto a channel member 126 serving as a bearing mount for a plurality of shafts 128 which carry cylindrical rollers 130 arranged so as to provide a diverging entranceway with respect to the cylindrical rollers 116 at one side of the roller assembly 108; this entranceway can be easily seen in FIGURE 7, the purpose of the entranceway being to permit the lettuce heads to enter without interference. It is intended that the movable compression roller assembly be normally urged toward the fixed assembly 108. Accordingly, a downwardly and outwardly inclining link 132 is pivotally connected at its upper end to an extension member 133 fixedly attached to the channel member 104. The link 132 is pivotally connected at its lower end to the outer end of a connecting link 134 that is pivotally attached at its other end to the rectangular frame 124. Through the agency of a biasing spring 136 the movable compression roller assembly 118 is urged toward the fixed compression roller assembly 108, there being a turnbuckle 138 whereby the degree of spring action can be changed so as not to exert too much pressure on the lettuce head being sensed. By reason of the roller construction, any friction between the units or assemblies 108, 118 is minimized.

Further included in the sensing mechanism 16 is a bracket 140 extending downwardly from the underside of the channel 104, the purpose of the bracket 140 being to support a snap-acting switch 142 having internally disposed contacts that are normally held open but which are permitted to close when a switch actuator 144 in the form of an adjustable screw threadedly carried on the link 122 is moved away from said switch. Thus, the switch actuator 144 can be adjusted so as to allow the snap-acting switch 142 to close whenever the movable compression roller assembly 118 has been deflected sufficiently by a lettuce head, the screw or actuator 144 being set for a size of lettuce head that is considered to represent full maturity or growth of the head.

In practice, the compression roller assemblies 108 and 118 of the sensing mechanism 16 are disposed approximately 20 inches ahead of the cutting mechanism 14. Accordingly, provision is made for incorporating into the harvester 11 a delay or memory such that the cutting mechanism 14 is not activated until the harvester 11 has advanced the 20 inches after a lettuce head has been selected. The memory mechanism or means that is utilized has been designated generally by the reference numeral 146. Included in this mechanism 146 are a pair of magnetic clutches 148 and 150, the clutch 148 having directly associated therewith a double grooved pulley 152 and the clutch 150 a double grooved pulley 154. As best seen in FIGURE 8, a flexible belt 156 is entrained about the pulleys 152 and 154, being disposed in the outer groove of these double grooved pulleys. In will also be noted that a flexible belt 158 extends from the pulley 152, being disposed in the other groove thereof, to a pulley 160 (see FIGURES 9 and 10) on an idler shaft 162 having a second pulley 164 thereon. Still another belt 166 extends from the pulley 164 to an indexing or distance measuring wheel 168 that rolls along the ground and which determines when the previously mentioned 20 inches has been traversed by the harvester 11.

With continued reference to the memory mechanism or means 146, it can now be pointed out that this mechanism further includes a pair of cam shafts 170, 172. The cam shaft 170 carries a centrally disposed cam 174 and left and right cams 176, 178 (as viewed in FIGURE 8). In a similar manner, the cam shaft 172 carries a cam 180 at the left and a more centrally located cam 182. The cam 174 actuates a first pulse switch 184, the cam 176 a first circuit control switch 186, and the cam 178 a circuit transfer switch 188. In like manner, the cam 180 actuates a second pulse switch 190 and the cam 182 a second circuit control switch 192. The foregoing cams and switches are also shown diagrammatically in FIGURE 10.

Having mentioned the above switches, it will now be of help to refer to the schematic circuit shown in FIGURE 11. Each of the above-mentioned switches is shown in this circuit of FIGURE 11 in association with other components. In this regard, a battery 194 is included for the purpose of supplying power to the circuit, a manual control switch 196 being connected in series with said battery. A manual cutter release switch 198 is depicted in parallel with the pulse switches 184 and 190; a cutter cycle control switch 200 is also connected in parallel with the pulse switches 184 and 190. The specific function performed by the various switches is best left for description during an operational sequence hereinafter presented.

It will be appreciated, though, that by suitable operation of the various switches that have been alluded to that a solenoid 202 can be energized. The solenoid 202 is directly associated with a four-way valve 204. The valve 204 is connected to a hydraulic pump 206 that receives liquid from a reservoir 208, the reservoir in turn being connected back to the valve 204 to complete the hydraulic circuit. The four-way valve 204 supplies liquid under pressure to the previously-mentioned hydraulic motor 62 that is coupled to the lower shaft 60 of the cutting mechanism 14.

The switch 200 also appears in FIGURE 3. From this figure, it will be perceived that the switch 200 is fixedly mounted on an L-shaped bracket support 214 which is in turn attached to a suitable portion of the frame of the cutter mechanism 14. A cam 216, affixed to the shaft 58 so as to be rotatable therewith, has a notch 218 formed in its periphery so that the switch 200 will be held closed except when the notch 218 is aligned therewith. For the sake of simplicity, it will be assumed that the number of links in each of the chains 68 and the number of teeth on each sprocket 64, 66 are such that one revolution of the shafts 58 and 60 will advance either knife basket 70 from position #1 in FIGURE 4 to position #1a. Thus, the switch 200 is held closed by the cam 216 after initial movement thereof until the shaft 58 has made one revolution.

It should be recognized that while the sensing mechanism 16 and the cutting mechanism 14 are about 20 inches apart, lettuce heads are grown approximately 13 to 15 inches apart in the row. Accordingly, there may at times be two mature heads between the sensing mechanism 16 and the cutter mechanism 14. As such, the disclosed memory mechanism 146 has actually two memory units in the depicted sequencing arrangement so that if two successive heads in a row are mature, one memory unit can respond to the first head and the other memory unit can respond to the second mature head. This results in a certain overlap of operation of the two memory units whereby the second memory unit may have begun operation before the first has activated the cutting unit 14.

In the following description of the operation, it is assumed that two successive heads in the row being harvested are mature. Assuming that the vehicle moves forward in the direction of the arrow 210, and that the cutting mechanism 14 and the sensing mechanism 16 have been lowered to the appropriate elevation for harvesting, each head of lettuce 212 is selected on the basis of its size and firmness. Appropriate adjustments are made to the activator 144 and the turnbuckle 138 for the size and firmness desired. Immature heads will be relatively small and not as firm as the fully grown ones. As previously described, heads of the proper size and firmness will deflect the compression roller assembly 118 away from compression roller assembly 108. Smaller and less firm heads will pass the compression roller assemblies without deflecting compression roller assembly 118.

As the harvesting begins, switches 142, 186, 192, 198 and 200 are open. Switch 188 is in closed position for the circuit controlling the first clutch 148 as shown in FIGURE 11 but is open with respect to the circuit for the second clutch 150. Clutches 148 and 150, although not engaged, are being constantly driven by the distance measuring and driving wheel 168.

The first head of lettuce of proper maturity is engaged by sensing mechanism 16 and roller assembly 118 is moved laterally (to the right in FIGURE 6) by the mature head. This movement of assembly 118 moves activator 144 to close the head selector switch 142, as previously described, completing the circuit through circuit transfer switch 188 to magnetic clutch 148, thus engaging the clutch 148 to rotate the cam shaft 170.

Rotation of cam shaft 170 causes cam 176 to close switch 186, thus making continued operation of the clutch 148 (and consequently continued rotation of cam shaft 170) independent of the action of the head selector switch 142.

Shortly after switch 186 is closed, the continuing forward movement of the vehicle brings the sensing mechanism 16 including the roller assembly 118 beyond the first mature head selected and the roller assembly 118 is moved laterally (to the left in FIGURE 6) by the spring 136 thus again engaging the switch 142 with activator 144 to open switch 142 in preparation for the selection of the next mature head.

At about the time the head selector switch 142 is thus again opened, the continuing forward movement of the vehicle driving the wheel 168 which in turn rotates the engaged clutch 148 causes shaft 170 to rotate cam 178 to open circuit transfer switch 188 to the first clutch 148 and close switch 188 to the second clutch 150.

If the adjacent head in the row is mature, the roller assembly 118 will be moved as before and head selector switch 142 will again be closed but this time, because of the position of circuit transfer switch 188, the second clutch 150 will be activated to rotate cam shaft 172.

Rotation of shaft 172 moves cam 182 to close switch 192 thus making continued operation of the clutch 150 (and consequently continued rotation of cam shaft 172) independent of the action of the head selector switch 142.

Shortly after switch 192 is closed, the continuing forward movement of the vehicle brings the sensing mechanism unit 16 including roller assembly 118 beyond the second mature head selected and movement of the roller assembly 118 by the spring 136 again opens switch 142 in readiness to select the next (the third) mature head.

While the second mature head is being selected and the second circuit including clutch 150 is being engaged, shaft 170 has continued its rotation and now its rotation causes cam 174 to close pulse switch 184 which activates the solenoid valve 202–204 which in turn permits pump 206 to operate the hydraulic motor 62.

Operation of motor 62 activates the cutter mechanism 14. As the cutter 14 moves, the cam 216 closes cutter cycle control switch 200 to maintain a closed circuit to the solenoid 202 for valve 204. As the cutter unit 14 continues its travel, the knife basket 70 moves from position #1 shown in FIGURE 4 through position #2 and #3 to position #4. In its movement from position #1 to position #4, knife basket 70 is moved about the axis of shaft 78 by the cam follower 82 as determined by the shape of cam track 84 to sever the head at position #2 and deposit it upon the conveyor 88 at position #3.

After depositing the first head on the conveyor 88, continued movement of the cutter unit 14 to position #4 of FIGURE 4 (also position #1a) opens the cutter cycle control switch 200 thus deactivating the solenoid valve 202–204 and stopping hydraulic motor 62.

The rotation of shaft 170 now causes cam 178 to close circuit transfer switch 188 to the circuit for first clutch 148 and open switch 188 to the circuit for second clutch 150, thus to ready the circuit for first clutch 148 for the next (the third) head when it is selected. Cam 176 now opens switch 186 thus opening the circuit for the first clutch 148 to disengage the same.

Meanwhile, the second circuit through closed switch 192 has maintained clutch 150 engaged and thus shaft 172 rotating. Now the rotation of shaft 172 causes cam 180 to close pulse switch 190 to activate solenoid valve 202–204 thus permitting hydraulic motor 62 to again operate to drive the cutter mechanism 14 through its second cycle. As before, movement of cutter mechanism 14 closes switch 200 to maintain the closed circuit to the solenoid valve 202–204. After cutting and depositing the second head in the conveyor, the continued movement of the cutter unit 14 through the agency of the cam 216 opens switch 200 to deactivate the solenoid valve 202–204 and stop the hydraulic motor 62.

Finally, rotation of shaft 172 causes cam 182 to open switch 192 to open the circuit to, and thus disengage, the second clutch 150.

Upon engaging another mature head, the compression roller assembly 118 will close switch 142 to activate the appropriate circuit for either the first clutch 148 or the second clutch 150 depending upon the position of circuit transfer switch 188 whereupon the cycle will be repeated.

It will, of course, be understood that various changes may be made in the form, details, arrangements and proportions of the parts without departing from the scope of my invention as set forth in the appended claims.

What is claimed:
1. A cutting and conveying mechanism for a vegetable harvester comprising:
    (a) a cradle for holding a vegetable head;
    (b) a knife edge defining one terminal edge of said cradle;
    (c) means for moving said knife edge along and substantially parallel to a row of vegetable heads to be harvested, and
    (d) means to move said knife edge transversely of the row of heads,
    (e) whereby a vegetable head is severed from its stalk and then moved away from the row.
2. A cutting and conveying mechanism for a vegetable harvester comprising:
    (a) a cradle for holding a vegetable head;
    (b) a knife edge defining one terminal edge of said cradle;
    (c) means for moving said knife edge along and substantially parallel to a row of vegetable heads to be harvested, and
    (d) means to move said knife edge transversely of the row of heads intermittently,
    (e) whereby a vegetable head is severed from its stalk and moved away from the row.
3. An apparatus comprising:
    (a) a vehicle;
    (b) an endless conveyor mounted on the vehicle;
    (c) a plurality of cradles carried by said conveyor,
    (d) one side of each of said cradles terminating in an elongated knife edge,
    (e) said elongated knife edges being positioned substantially parallel to the vehicle, and
    (f) means including said conveyor for moving said knife edges laterally of the vehicle.
4. The apparatus of claim 3 including:
    (a) means for pivoting said cradles with respect to said conveyor.
5. An apparatus for harvesting vegetable heads comprising:
    (a) a vehicle;
    (b) a conveyor mounted on said vehicle;
    (c) a cradle pivotally mounted on said conveyor;
    (d) said cradle having a knife edge along one terminal edge thereof;
    (e) receptacle means adjacent to said conveyor, and
    (f) means including said conveyor for moving said cradle through a row of heads to be harvested and past said receptacle means,
    (g) whereby as said vehicle travels along a row of vegetable heads a head is severed from its stem by said knife edge, carried by said cradle to said receptacle means and deposited therein.
6. The apparatus of claim 5 including:
    (a) means for pivoting said cradle with respect to said conveyor.
7. The apparatus of claim 5 wherein:
    (a) said receptacle means is a conveyor.
8. An apparatus for harvesting vegetable heads comprising:
    (a) a vehicle;
    (b) a plurality of knives;
    (c) conveyor means mounted on said vehicle for supporting and moving said knives to sever heads to be harvested from their stems;
    (d) a plurality of cradles supported by said conveyor means,
    (e) each of said cradles being positioned with respect to one of said knives to receive and carry a head severed by the associated knife;
    (f) a receptacle adjacent to said conveyor means, and

(g) said conveyor means being adapted to move said cradles through a row of heads to be harvested and past said receptacle, (h) whereby as said vehicle travels along a row of vegetable heads, heads are severed from their stems by said knives, roll into the cradles and are carried by said cradles to said receptacle and deposited therein.

9. The apparatus of claim 8 in which:
(a) the knives are elongated and supported with respect to said vehicle so that they extend substantially parallel to the row as the vehicle moves therealong and in which the conveyor means is adapted to move the knives transversely through the row.

10. The apparatus of claim 9 in which:
(a) said conveyor means moves said knives intermittently.

11. The apparatus of claim 10 including:
(a) means for pivoting said cradles with respect to said conveyor.

12. The apparatus of claim 11 in which:
(a) each of said knives is integral with a cradle.

13. A cutting mechanism for harvesting lettuce heads comprising:
(a) upper and lower horizontal rotatable shafts;
(b) a sprocket at each end of each shaft;
(c) a pair of chains entrained about said sprockets;
(d) a basket connected to said chains so as to be movable therewith,
(e) said basket having a knife edge, and
(f) means for intermittently moving said shafts to cause said knife edge to sever a selected head of lettuce.

14. The cutting mechanism of claim 13 in which:
(a) said basket is pivotally connected to said chains at a locus remote from said knife edge, and
(b) said mechanism includes a cam track and cam follower for guiding said basket.

References Cited by the Examiner
UNITED STATES PATENTS

| | | | |
|---|---|---|---|
| 716,045 | 12/1902 | Huske | 56—327 |
| 1,025,693 | 5/1912 | Franklin | 56—121.42 |
| 1,235,843 | 8/1917 | Rush | 56—121.4 |
| 1,303,798 | 5/1919 | Janes. | |
| 1,314,999 | 9/1919 | Allen | 56—327 |
| 2,510,474 | 6/1950 | Kugler | 56—327 X |
| 2,707,860 | 5/1955 | Schmidt | 56—327 |

ABRAHAM G. STONE, *Primary Examiner.*

RUSSELL R. KINSEY, *Examiner.*